Nov. 26, 1929. W. S. BARKER 1,737,211
FARROWING APPARATUS
Filed March 12, 1928 2 Sheets-Sheet 1

Inventor
W. S. Barker.
By Lacey & Lacey, Attorneys

Nov. 26, 1929.  W. S. BARKER  1,737,211
FARROWING APPARATUS
Filed March 12, 1928  2 Sheets-Sheet 2
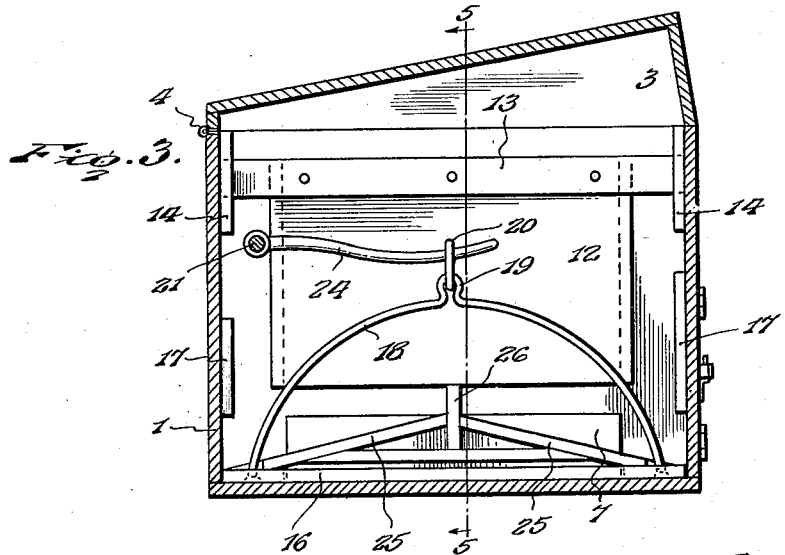
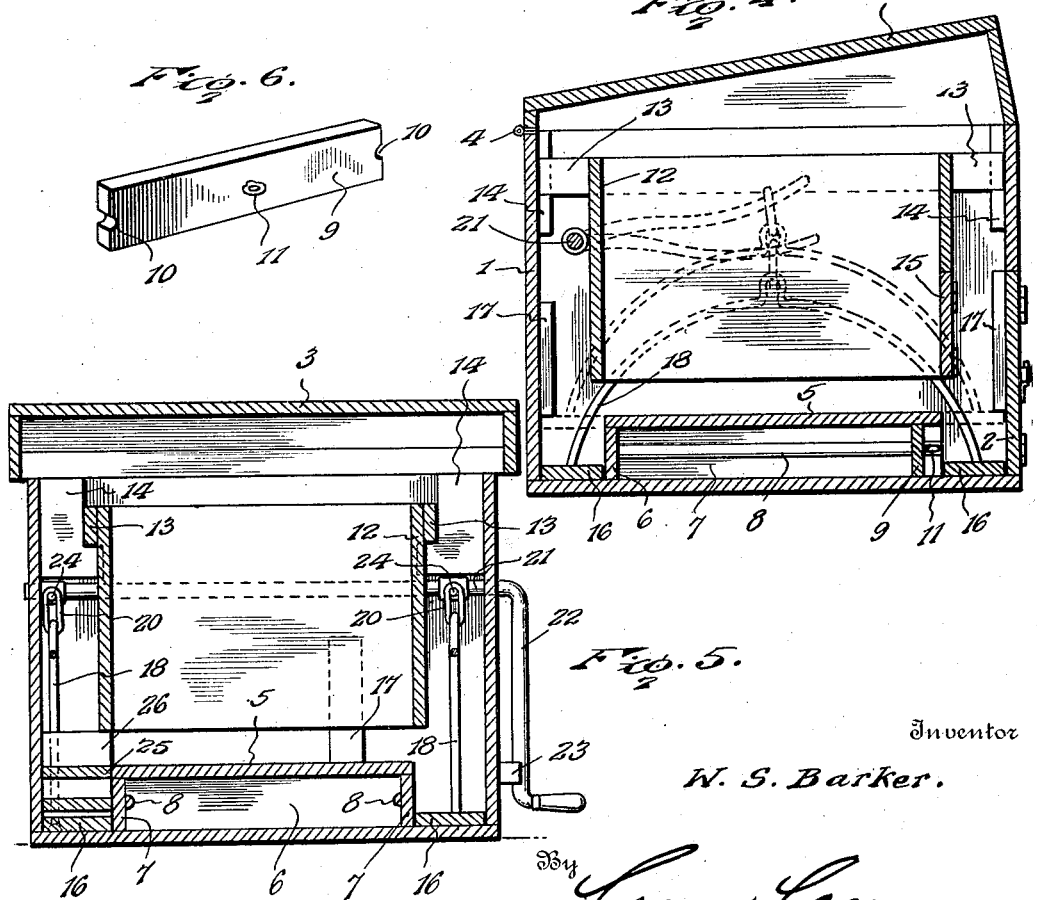
Inventor
W. S. Barker.
By Lacey & Lacey Attorneys Patented Nov. 26, 1929

1,737,211

UNITED STATES PATENT OFFICE

WILLIAM S. BARKER, OF PANA, ILLINOIS

FARROWING APPARATUS

Application filed March 12, 1928. Serial No. 261,113.

The object of this invention is to save young pigs. In farrowing, the sow very frequently rolls from side to side and crushes the litter so that a large proportion of the pigs are killed at birth. Heavy losses are incurred by farmers and stock raisers from this cause and the object of the invention is to provide a farrowing pen or cage of such construction that the young pigs will immediately fall beyond the danger zone so that the possibility of their being crushed by the sow is overcome.

A further object of the invention is to provide means whereby the young pigs may be placed in position to nurse as the need arises and a further object is to provide means whereby the young pigs may protect themselves from cold when necessary.

Other objects will appear incidentally in the course of the following description and the invention resides in certain novel features which will be particularly pointed out in the appended claims.

In the annexed drawings which illustrate one embodiment of my invention:

Figure 1 is a perspective view of the cabin or pen;

Fig. 2 is a top plan view of the same with the cover or roof removed;

Fig. 3 is a sectional elevation, the section being taken on the line 3—3 of Fig. 2;

Fig. 4 is a central longitudinal section;

Fig. 5 is a transverse section on the line 5—5 of Fig. 3; and

Fig. 6 is a detail.

In carrying out the invention there is provided an enclosure 1 which is preferably of rectangular form and is equipped with a door 2 in one side through which the sow may be driven at the proper time. For convenience, the side containing the door may be considered as the front. This enclosure is also provided with a roof 3 which may be of any approved form and is preferably hinged, as shown at 4, whereby it may be swung to open position for ventilation as may be desired. Within the enclosure and spaced from all sides of the same is a platform 5 which is supported by a back plate 6 and side plates 7, the side plates being provided each on their inner opposed faces with cleats 8 for a purpose which will presently appear. The back plate and the side plates are spaced equi-distantly from the corresponding side walls of the enclosure and provide a chamber below the platform which may be utilized as a hovering chamber by the young pigs, it being noted that the front edge of the platform is unsupported so that the chamber below the same is open at the front. Slidably mounted within the said chamber and engaged with the cleats 8 is a follower 9 having grooves or recesses 10 in its edges whereby it will be fitted to and guided by the cleats and on the front side of the follower is an eye or ring 11 which may be engaged, when necessary, by a hooked implement inserted through the open door 2. When it is cold weather the hooked implement may be inserted and the follower 9 pushed to the rear of the chamber below the platfom 5, leaving the chamber accessible to the young pigs who will naturally enter the same for warmth. When it is desired that the pigs should feed or for any other reason they should leave the chamber most of them will leave voluntarily but if any should not leave, the hooked implement may be again inserted and engaged with the retracted follower so that it may be drawn forwardly and by pushing against the pigs cause them to leave the chamber.

The platform 5 is intended to support the sow during farrowing and in order that she may be restrained and kept upon the platform there is provided an inner cage or pen consisting of walls 12 connected to form an open top and open bottom rectangle having dimensions substantially equal to the dimensions of the platform. Along two sides of this cage or pen at the top thereof I secure supporting bars 13, the ends of which project beyond the front and rear of the pen and are adapted to engage supports 14 provided therefor upon the front and rear walls of the enclosure. These supports may very conveniently be blocks secured to the walls of the outer enclosure and recessed as shown most clearly in Fig. 5. It may be noted that in the front of the pen there is a door 15 which is to be alined with the door 2 when the pen is in place so that the sow may be easily driven into the space within the pen to be kept upon the platform 5.

Surrounding the supporting walls 6 and 7 of the platform is a movable lifter or elevator comprising a floor 16 fitting between the walls 6—7 and the respective adjacent walls of the outer enclosure, and means whereby this movable floor may be lifted to lie flush with the platform 5. To limit the upward movement of this floor 16, stop blocks 17 are secured upon the front and rear walls of the outer enclosure to project into the path of said floor, as will be understood upon reference to Fig. 4. Attached to the side members of this movable floor 16, at the front and rear thereof, are lifting bails 18 which are disposed between the outer enclosure and the inner pen and are formed at their centers with eyes 19 in which are engaged links 20.

At the rear of the structure a rock shaft 21 extends across the same and is journaled in the side walls thereof, one end of the shaft being extended through the adjacent wall and formed into or equipped with an operating handle 22. Upon said side wall is a stop block 23 adapted to be engaged by the handle so that the handle may be held in a set position. Secured to the rock shaft and extending forwardly therefrom, adjacent the ends thereof, are lever arms 24 which have their free ends playing in the links 20, as will be understood upon reference to Figs. 3 and 5. The arms are slightly curved upwardly at their free ends to guard against accidental release of the links. Normally, the floor 16 is in its lowest position shown by full lines in the drawings. If it should be desired that the young pigs feed, the shaft is rocked so that an upward movement is imparted to the lifting arms 24 and this movement is transmitted through the links 20 and bails 18 to the floor so that the latter will be raised, as indicated by dotted lines in Figure 4, to a position flush with the platform 5. It will be noted that the lower edge of the pen 12 is spaced above the platform 5. As the pigs are born they will drop through the space between the platform 5 and the pen 12 onto the floor 16 and this space is such that while the newly born pig will readily pass therethrough the drop is not great enough to injure the pig. When it is desired that the pigs nurse, the floor 16 is raised as described and the young pigs will thereby be brought into position to reach the mother and easily suckle.

At one side of the structure inclined ways 25 are provided upon the floor 16, as shown most clearly in Fig. 3, these ways extending upwardly from the front and rear of the floor toward the center thereof where they are joined by a division block 26, and it will be noted upon reference to Fig. 5 that the upper inner corner of this block projects under the edge of the pen 12 so that when the floor 16 is raised, upward movement will be imparted to the pen and consequently the latter will clear the sow sufficiently to facilitate the feeding of the young pigs. This lifting movement of the pen will be accommodated by the construction of the supporting blocks 14 which, at the same time, will prevent rocking of the pen. When the floor is in its lowest position the inclined ways 25 will have their highest points flush with the platform 5, as will be understood upon reference to Fig. 3, and any young pig which may desire to nurse prior to a stated feeding time or between feeding times may easily pass up either runway to reach the platform and the sow. The runway or floor 16 may be held in a raised position by properly engaging the handle 22 with the latch or stop bar 23 so that the young pigs emerging from the chamber under the platform 5 will be then compelled to remain below until the runway is again lowered to permit feeding.

When the time arrives for liberation of the sow, the roof of the structure may be swung into open position or removed and the pen can then be easily lifted from the outer enclosure, whereupon the door of the enclosure is opened and the sow will at once pass out, or the doors of the pen and the enclosure may both be opened to permit the exit of the sow, the pen remaining in place.

Having thus described the invention, I claim:

1. Apparatus for the purpose set forth comprising an outer enclosure, a raised platform therein, and a rigid restraining pen removably supported within the enclosure and spaced from the walls thereof over the platform with its lowest end spaced vertically from the platform at all times.

2. Apparatus for the purposes set forth comprising an outer enclosure, fixed supports on the front and rear walls thereof, and an open bottom pen adapted for emplacement within the enclosure with its sides in spaced relation to the walls of the enclosure, and supporting bars secured upon the sides of said pen and adapted to engage the fixed supports.

3. Apparatus for the purpose set forth comprising an outer enclosure, a raised platform therein, means above the platform for holding a sow thereon, and a vertically movable floor disposed around the platform between the same and the walls of the enclosure.

4. Apparatus for the purpose set forth comprising an outer enclosure, a platform supported within the enclosure above the bottom of the same and in spaced relation to the walls thereof, a restraining pen supported within the enclosure over and in vertically spaced relation to the platform, and means at a side of the platform to prevent the pen dropping to the platform.

5. Apparatus for the purpose set forth comprising an outer enclosure, a platform supported within the enclosure above the bottom of the same and in spaced relation to all the walls thereof, means above the platform for restraining a sow thereon, and means for closing the space between the platform and the bottom of the outer enclosure along three sides of the platform whereby to provide a chamber open at one side and in communication with the space between the platform and the enclosure.

6. Apparatus for the purpose set forth comprising an outer enclosure, a platform within the enclosure and in spaced relation to all the walls thereof, platform supporting means defining a chamber open at one side, and a follower slidably fitted in said chamber.

7. Apparatus for the purpose set forth comprising an outer enclosure, a pen supported therein in spaced relation to the walls of the same, a platform within the enclosure in spaced relation to the bottom and sides of the enclosure and to the bottom of the pen, a floor fitting within the space between the platform and the walls of the enclosure, a rock shaft mounted at the back of the enclosure, connections between said rock shaft and the floor whereby to raise and lower the floor, and means for limiting the upward movement of the floor.

8. Apparatus for the purpose set forth comprising an outer enclosure, a platform therein spaced from all the walls of the enclosure, a restraining pen above the platform having its lower end spaced vertically from the platform, a vertically movable floor between the walls of the enclosure and the platform, and upwardly converging runways upon said floor at one side of the platform.

9. Apparatus for the purpose set forth comprising an outer enclosure, a raised platform therein spaced from all the walls of the same, a restraining pen over the platform and spaced vertically therefrom, a vertically movable floor extending around the platform between the same and the walls of the enclosure and normally in the lowest position, bails rising from said floor at the sides of the pen, a rock shaft mounted in the outer enclosure at the back of the pen, lifting arms secured to the rock shaft and extending forwardly therefrom, operative connections between the lifting arms and the bails, and means for rocking the shaft and holding it in a set position.

10. Apparatus for the purpose set forth comprising an enclosure, a platform therein supported above the floor thereof and in spaced relation to the walls of the same whereby to define a pig-receiving space below and around the platform, means for holding a sow on the platform, and means for lifting the pigs in the pig receiving space to the level of the platform.

In testimony whereof I affix my signature.

WILLIAM S. BARKER. [L. S.]